UNITED STATES PATENT OFFICE.

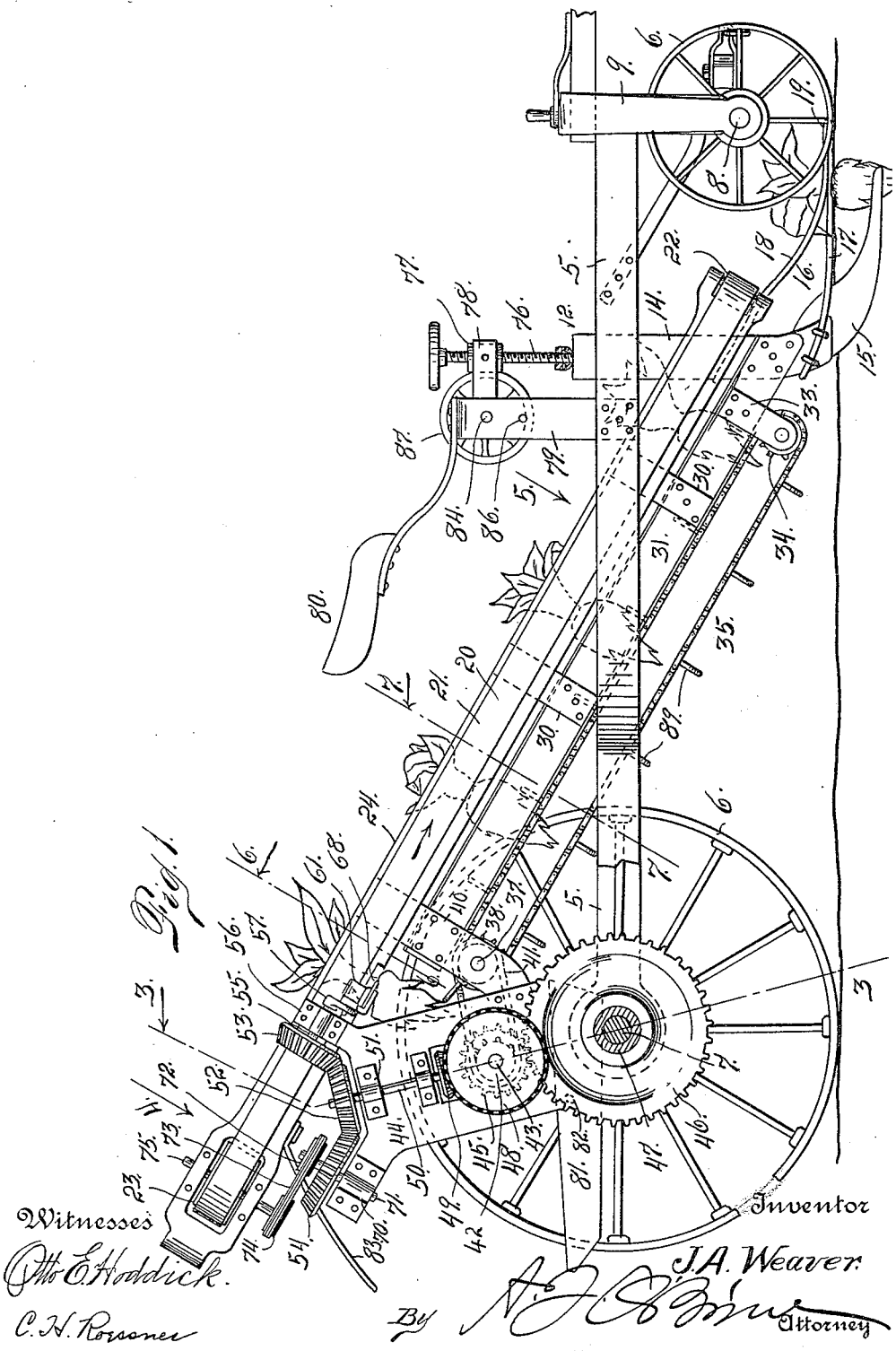

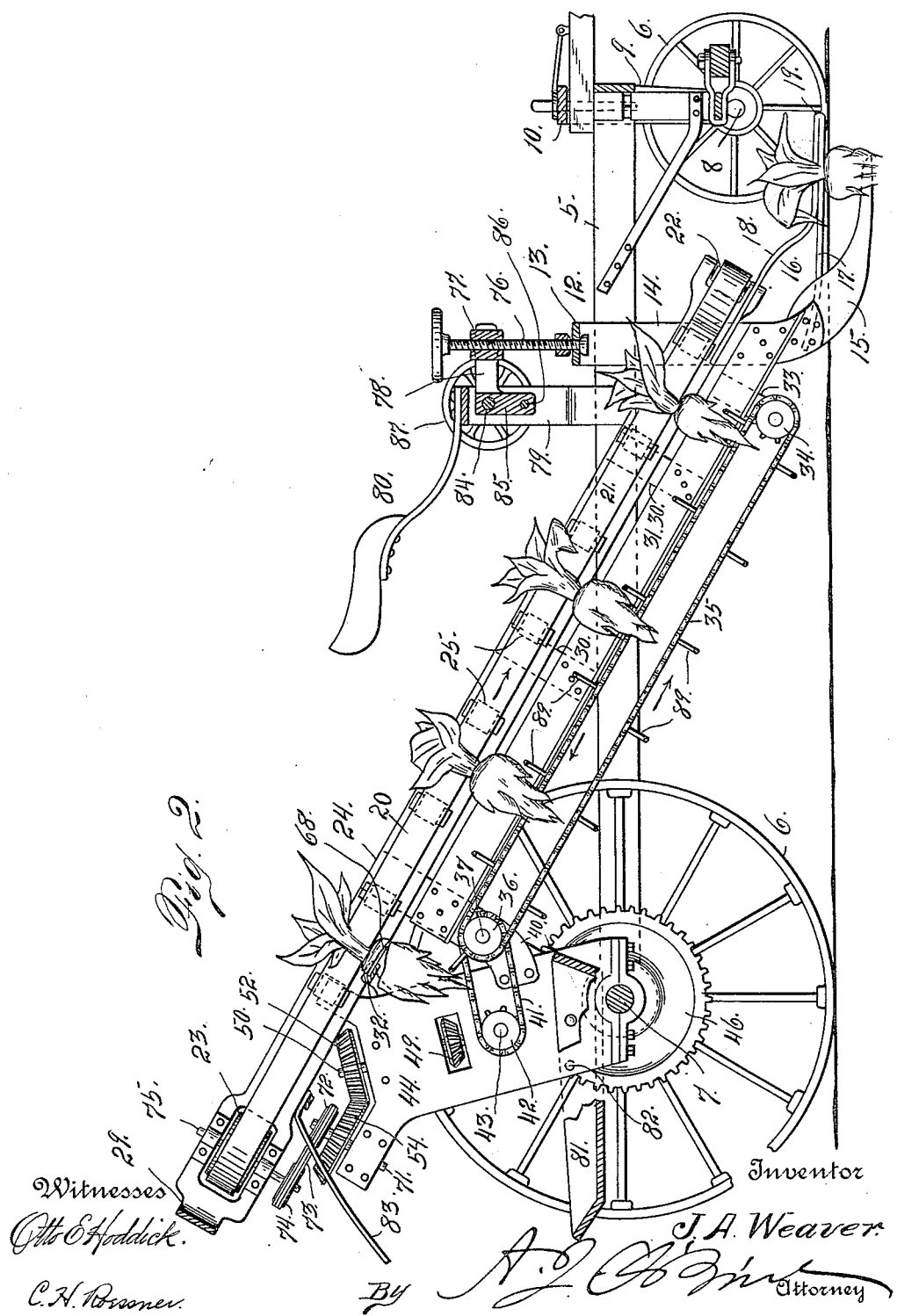

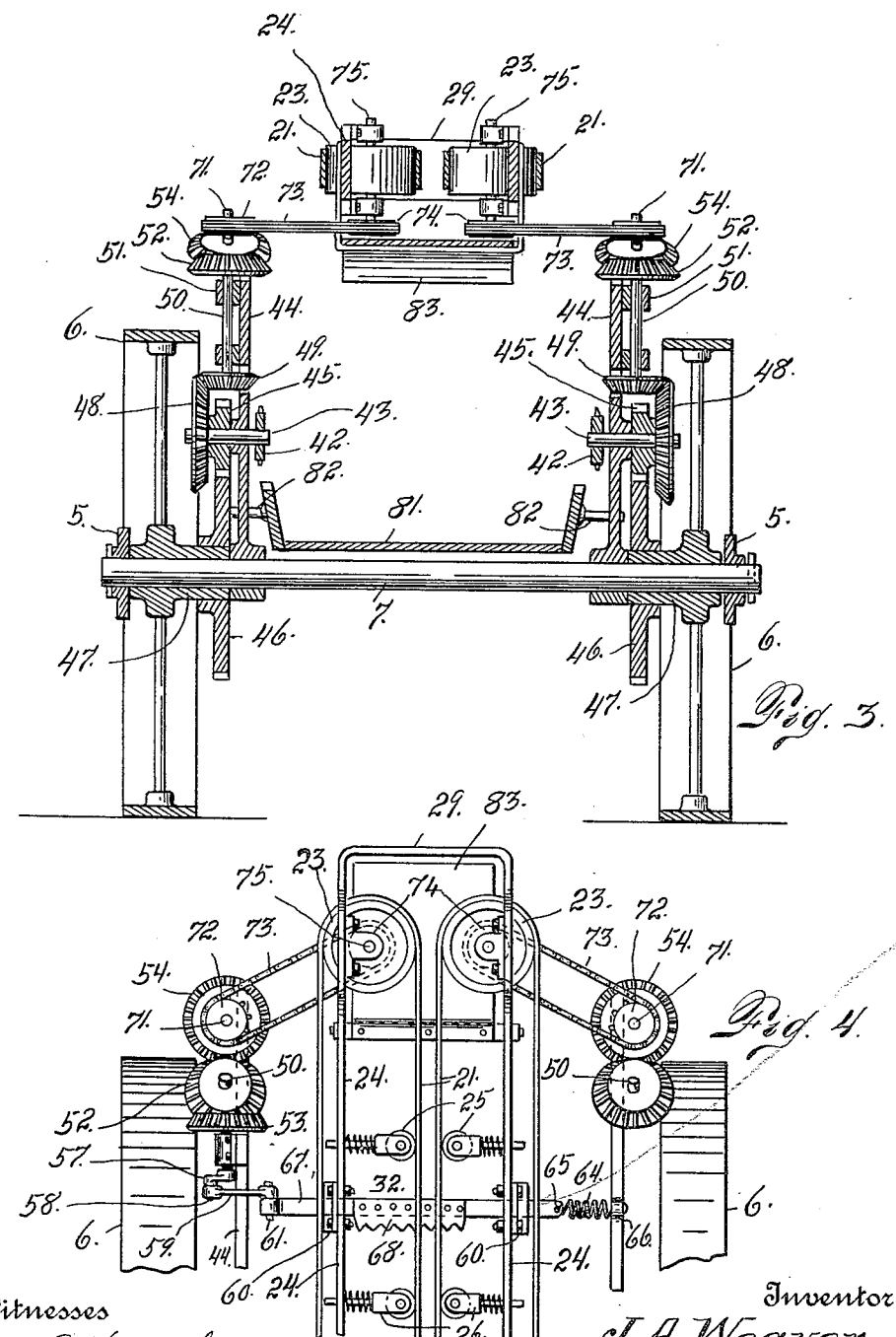

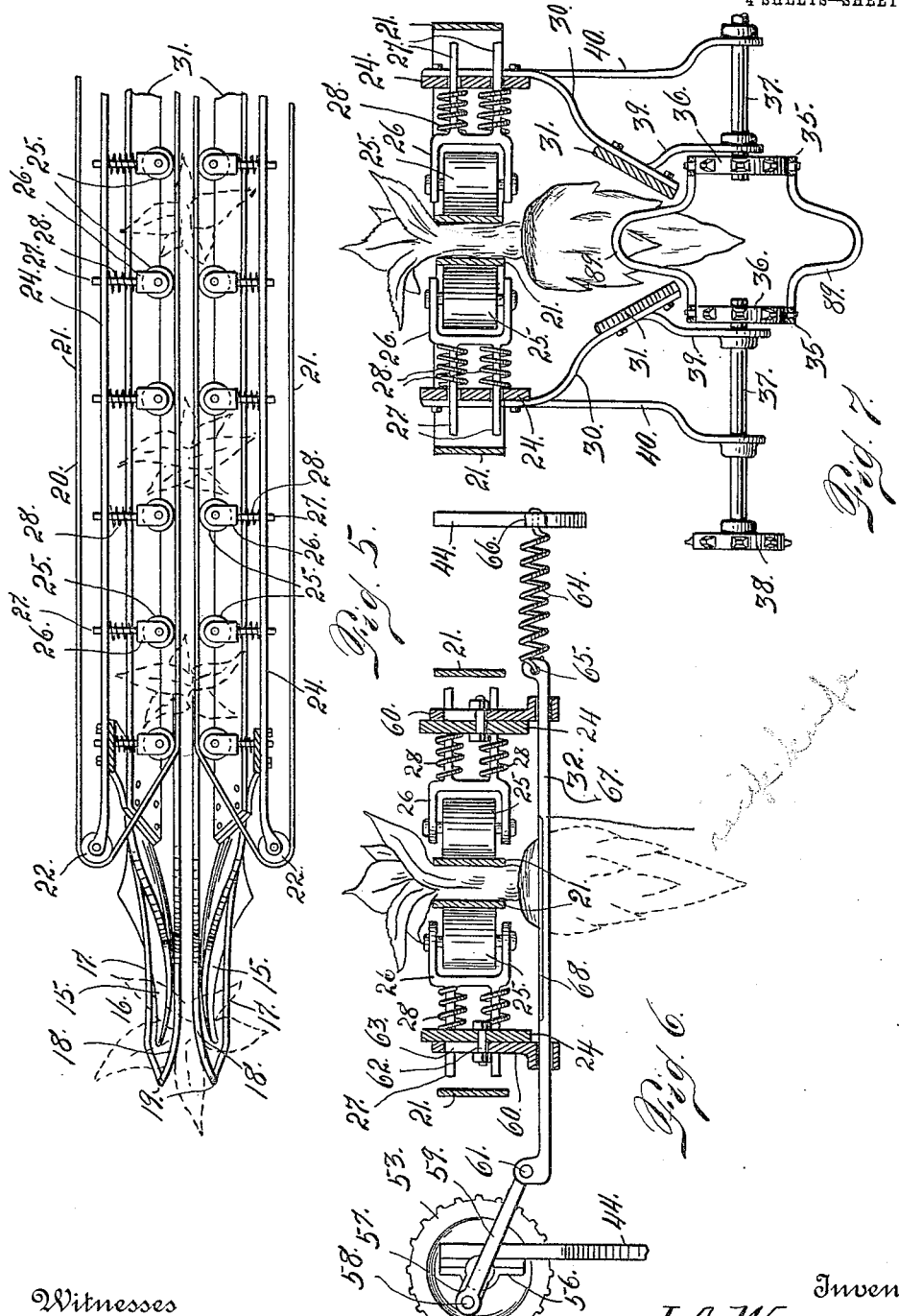

JOHN A. WEAVER, OF GREELEY, COLORADO.

BEET-HARVESTER.

1,086,631.　　　　　Specification of Letters Patent.　　Patented Feb. 10, 1914.

Application filed June 18, 1912.　Serial No. 704,361.

*To all whom it may concern:*

Be it known that I, JOHN A. WEAVER, citizen of the United States, residing at Greeley, county of Weld, and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in beet harvesters, my object being to provide a construction of this class which shall be thoroughly practicable, special attention being given to the successful topping of the beets or other similar vegetables which require to be uprooted and which have a top or foliage extending above the surface of the ground.

To this end my improved machine is mounted on ground wheels and is provided with two conveyers, namely, a chain conveyer and a belt conveyer, the chain conveyer being equipped with flights adapted to act upon the beet or other similar vegetables for carrying them upwardly to the topping device after they have been uprooted, the belt conveyer serving to hold the tops or foliage of the beets in such a manner that they will not obstruct the action of the knife which performs the topping function. This knife is mounted to reciprocate in the path of the necks of the beets as they are carried upwardly by the conveyers, the knife being located in a suitable plane for performing the topping function. The foliage of the beets, after being removed, is carried upwardly by the belt conveyer and discharged at the rear extremity of the machine.

Suitable uprooting means are employed consisting of two members which pass on opposite sides of the beets, the said uprooting devices being curved upwardly from their forward extremities whereby as the machine proceeds the beets are uprooted and at the same time elevated sufficiently to bring the root or body part into the path of the flights of the chain conveyer, while the top or foliage is held by the belt conveyer.

The machine is further equipped with devices also arranged on opposite sides of the beets and adapted to pass underneath the foliage whereby this foliage is lifted from the ground and held in position to be grasped by the belt conveyer as the beets leave the uprooting devices.

Having briefly outlined my improved construction, I will proceed to describe the same in detail, reference being made to the accompanying drawing, in which is illustrated an embodiment thereof.

In this drawing: Figure 1 is a side elevation of the forward part of the machine, while the rear portion thereof is shown partly in section. Fig. 2 is a central longitudinal section of the machine. Fig. 3 is a section taken on the line 3—3 Fig. 1. Fig. 4 is a top view looking in the direction of arrow 4, Fig. 1. Fig. 5 is a fragmentary top plan view of the forward extremity of the machine looking in the direction of arrow 5, Fig. 1. Figs. 6 and 7 are sections taken on the lines 6—6 and 7—7, respectively, of Fig. 1, shown on a larger scale.

The same reference characters indicate the same parts in all the views.

Let the numeral 5 designate the frame work of the machine, the same being mounted on ground wheels 6. The rear wheels are mounted on an axle 7, while the front wheels engage stub axles 8, engaging the lower extremities of the arms 9 of a U-shaped frame, the said arms depending from the opposite extremities of a horizontal member 10 which is centrally pivoted on the frame work to allow the wheels to turn for steering purposes.

Mounted on the front part of the frame work is a U-shaped frame 12 having a horizontal member 13 and two depending members 14, to the lower extremities of which are secured plows or diggers 15, which are arranged on opposite sides of the row of beets when the machine is in use, as best illustrated in Fig. 5. Connected with the lower extremities of the depending members 14 are wire members 16 which are arranged on opposite sides of the row of beets, and are adapted to occupy a position practically in contact with the surface of the earth whereby they pass underneath the tops of beets. Each of these members, as illustrated in the drawing, consists of two parts 17 and 18, the part 17 being connected with the depending members 14 from which point it extends forwardly to the point 19 of the device where an abrupt bend is formed, the part 17 merging into the part 18 which extends rearwardly and upwardly, whereby as the devices 16 pass under the foliage of the beets, the leaves are raised and held in the raised position until they are engaged by the belt conveyer 20 which, as illustrated in the drawing, consists of two endless belts 21 which occupy an inclined position, each belt engaging a forwardly located roller 22 and a rearwardly located roller 23, the said rollers being mounted on longitudinally disposed bars 24, each of which also carries a number of tension rollers 25 which are arranged at suitable intervals and extend inwardly to engagement with the inner run of each belt whereby this run is held in operative engagement with the foliage of the beets as they are carried upwardly for topping purposes. Each tension roller 25 is pivotally mounted in a U-shaped frame 26, equipped with two stems 27 which pass through the bar 24, coil springs 28 surrounding the said stems and interposed between the bar and the frame 26 for giving the roller the necessary pressure to hold the inner run of the belt in the aforesaid relation.

The two bars 24 are connected at their rear extremities by a transverse part 29, the two bars constituting, in fact, an integral device composed of the bar members 24 which are arranged in parallel relation and the transverse connecting part 29 located in the rear. The two bars 24 are each provided with a number of depending arms 30, to whose lower extremities are secured longitudinally disposed members 31 which are arranged on opposite sides of a line coincident with that of the row of beets, the two members 31 being located on opposite sides of the beets as they are carried upwardly and constituting a sort of bottomless trough to control the dirt which falls from the beets during their upward travel. This trough-shaped structure extends from the plow-supporting members 14 upwardly, terminating just forward of the reciprocating knife 32, which performs the beet topping function. Extending downwardly from each of the members 31 near its forward extremity is an arm 33, in which is mounted a sprocket wheel 34 which is engaged by an endless chain conveyer 35, which also engages, at its upper extremity, similar sprocket wheels 36, the latter being mounted on shafts 37 and supported by depending parts 39, connected with the members 31 and of substantially the same construction as the members 33. The shafts 37 are further supported by depending arms 40, which are connected at their upper extremities with the bars 24, which constitute their support. Each of the shafts 37 extends beyond its supporting arm 40, and at its outer extremity is located and made fast a sprocket wheel 38, which is connected by means of a chain 41 with a sprocket 42 fast on a shaft 43 journaled in a frame plate 44 supported by the rear axle 7 of the machine. It will be understood that there are two of these frame plates and two of the sprockets 42, the structure for operating the conveyers being duplicated on both sides of the machine, as best illustrated in Fig. 3.

Fast on each shaft 43 and located just outside of the frame plate 44 is a gear 45 meshing with a larger gear 46 fast on the hub 47 of each rear ground wheel 6. In this manner, motion is imparted from the ground wheels and through the instrumentality of the gears 46, 45, the shafts 43, the sprockets 42, the chains 41, the sprockets 38, the shafts 37 and the sprockets 36, to the conveyer 35 which is composed of two separated endless chains which are connected by flights 89, which are yoke-shaped and extend upwardly from the upper run of the conveyer and act upon the beets to cause them to travel rearwardly after they are uprooted in a manner that will be readily understood.

A beveled gear 48 is mounted and made fast on each shaft 43 adjacent the gear 45, the said beveled gear meshing with a gear 49 fast on the lower extremity of a shaft 50 journaled in boxes 51 mounted on the corresponding frame plate 44. To the upper extremity of the shaft 50 is made fast a beveled gear 52 which meshes with two similar gears 53 and 54. The gear 53 is fast on a shaft 55 journaled in a box 56, also mounted on a frame plate 44. The shaft 55 carries at its extremity, remote from the gear, a crank 57, having a wrist pin 58, which is connected by means of a pitman 59 with one extremity of a reciprocating knife 32 as shown at 61. This is a pivotal connection, and as the gear 53 is rotated, a reciprocating movement is imparted to the knife 32, which is mounted to slide freely in supports 60, said supports being vertically adjustable on the bars 24 by means of bolts 62 which pass through slots 63 formed in the said supports. By adjusting these supports the position of the reciprocating knife may be regulated to cause it to sever the beet tops in the proper plane.

To the opposite extremity of the knife from that where the pitman is connected, a coil spring 64 is located, one extremity of this spring being connected with the knife as shown at 65, while its opposite extremity is connected with a projection 66 formed on the frame plate 44 on the side of the machine opposite that where the gear 53 is located. From this it will be understood that while the gears 52 and 54, as well as the other gears in the train interposed between the gear 52 and the wheel hub 47 are duplicated on both sides of the machine, there is only one gear 53 whose function is the reciprocation of the knife 32 as heretofore explained. As illustrated in the drawing, this knife is composed of a supporting bar 67 and a saw-toothed blade 68 secured to the said bar, the blade being of sufficient length to remain in contact with the beet during the entire stroke of the knife in both directions.

Each gear 54 is journaled in a box 70, mounted on the upper part of the frame plate 44, the said gear being provided with a shaft 71 upon which is made fast a small sprocket wheel 72 connected by means of a chain 73 with another sprocket wheel 74 fast on a spindle 75 carrying a pulley 23 engaged by one of the endless belts 21 of the conveyer 20, as heretofore explained. In this manner movement is communicated from the wheels 6 to the pulleys 23 and thence to the belts 21 constituting the conveyer, which acts upon the tops of the beets during their upward movement to the reciprocating knife.

The frame for supporting the diggers or plows for uprooting the beets, the said frame being composed of the horizontally disposed parts 13 and the depending supports 14, is vertically adjustable by means of a screw 76 threaded in a nut 77 mounted on a bracket 78 secured to the upright U-shaped frame member 79 upon which the seat 80 is mounted. The lower extremity of the screw 76 is journaled or swiveled in the part 13 whereby as the screw is turned the said digger-supporting frame is vertically adjusted.

From the foregoing description, the use and operation of my improved construction will be readily understood.

The machine is moved across the field in such a position that the ground wheels straddle the row of beets to be acted upon, whereby the line of the row is between the two plows 15 and also between the two members 16 for the preliminary lifting the foliage of the beets whereby this foliage is raised sufficiently to be fed to a position between the two inner runs of the endless belts 21 constituting the conveyer 20. To facilitate the entrance of the foliage of the beets to the proper position with reference to these belts, the lower parts of the belts where they engage the pulleys 22 carried by the bars 24, are considerably separated, while from these pulleys the belts extend inwardly by reason of the arrangement of the lowermost pair of tension rollers 25 therewith, whereby the belt conveyer is provided with a sort of V-shaped mouth at its lower extremity, the said mouth being widest at its lower end. Hence, as the machine is moved while occupying the aforesaid position, the plows which pass beneath the surface of the earth a suitable distance, first loosen the beets and then raise them by virtue of the upward curve of the plows from their lower extremities rearwardly, whereby the beets are carried upwardly and brought into the path of the flights 89 of the chain conveyer simultaneously with the movement of the foliage into position between the inner rows of the two belts 21, as heretofore explained. It should be stated that the part 18 of the foliage-manipulating device 16, curves upwardly as it extends rearwardly, in a position approximately parallel with the upward curve of the diggers or plows from their points rearwardly, as heretofore explained. In this manner the bodies of the beets are carried upwardly by the plows into the path of the flights 89 of the conveyer 35, simultaneously with the movement of the foliage into the corresponding position between the belts of the conveyer 20. The bodies of the beets then being acted upon by the flights of the conveyer 35, while their tops are grasped by the aforesaid belts, are caused to travel upwardly in this position until they encounter the reciprocating knife 32 which severs the tops and allows the beets to drop downwardly into a box 81, which is pivotally mounted on the framework of the machine as shown at 82, the parts of the box forward of the pivot being heavier than the rear thereof causing the box to normally occupy a horizontal position. The position of the beets when their tops are severed is such that they normally drop into the forward extremity of the box. They will, however, gradually pile up in the box and roll rearwardly therein, and finally there will be a sufficient accumulation in the rear end of the box to overbalance the latter, causing it to turn on its pivot, whereby the beets will be dumped in piles. As soon as this is done the box will assume its normal position by virtue of the construction heretofore described.

As the machine travels, motion is imparted from the ground wheels to the chain conveyer 35 through the medium of the gears 46, 45, the sprocket wheels 42, chains 41, the sprocket wheels 38, shafts 37 and sprocket wheels 36. At the same time the reciprocating movement is imparted to the topping knife 32 from the ground wheels through the medium of the gears 46, 45, 48, 49, the shaft 50, the gears 52 and 53, the crank 57 and the pitman 59. The spring 64 steadies the reciprocation of the knife whereby its stroke is evenly maintained. Finally, motion is imparted to the endless belts 21 of the conveyer 20 from the ground wheels 6, through the medium of the gears 46, 45, 48, 49, the shaft 50, the gears 52 and 54, the shaft 71, sprocket wheels 72 and 74, the chains 73 and pulleys 23.

At the upward and rearward extremity of the machine, a downwardly and rearwardly inclined plate 83 is located, the same being attached to the bars 24 and so arranged that as the foliage of the beets is released by the belts 21, it will fall upon this plate and slide down to the ground in the rear of the machine, thus preventing it from interfering with or clogging any of the operating parts.

Referring to the two members 31 which constitute the oppositely arranged inclined sides of a bottomless trough, it may be stated that these members are arranged directly above the endless chains of the conveyer 35 and serve to guide the dirt which falls from the beets during their upward travel whereby the dirt is caused to fall in a central position between the two chain members of the conveyer, thus protecting the conveyer from the falling dirt which would otherwise interfere with its operation. It should also be understood that this trough is not intended to serve as a support for the beets during their upward travel, since during such travel the beets are supported by the belt conveyer whose members grasp the tops thereof with sufficient force to suspend the beets in the upright position, while the flights 89 of the chain conveyer act upon the beets and while they coöperate with the belt conveyer in moving the beets upwardly and rearwardly, they serve another important function, namely, that of acting on the beets in an opposing relation to the reciprocating knife which performs the topping function. In this capacity the said flights offer the necessary resistance to the beets on the opposite sides of the knife as the beets are brought into contact therewith, whereby the tops are readily severed, the flights preventing the action of the knife from swinging the beets forwardly, which forward movement would seriously interfere with the proper performance of the topping function.

The bracket 78 is laterally adjustable on the frame member 79 by means of a screw 84 which is journaled in the frame 79 and threaded in the rear part 85 of the said bracket. This bracket is slidable on a rod 86 also mounted in the frame 79. In this way the frame 12 which carries the plows is laterally adjustable for the purpose of regulating and centering the plows in order to bring them into the proper position with reference to the row of beets. The trough members 31 which are connected with the frame 12, together with the other parts of the structure connected therewith, will yield sufficiently should it be necessary. Only a small degree of movement if any after the parts are assembled, will in any event be required. In order to manipulate the screw 84 a hand-wheel 87 is secured to one extremity thereof.

The rear extremities of the frame bars 5 are mounted on the outer extremities of the rear axle 7, as best illustrated in Fig. 3.

The structure, including the members 31, the bars 24, the frame plates 44 and their connections, is mounted to turn on the axle 7 as the U-shaped frame 12 is vertically adjusted by means of the screw 76, the members 31 being secured to the parts 14 of the frame 12.

Having thus described my invention, what I claim is:

1. The combination with a conveyer for grasping the tops of beets and suspending the beets in the upright position, of a second conveyer located throughout its entire extent below the first conveyer and coöperating with the first conveyer to perform the carrying function, and means interposed between the two conveyers for performing the topping function while the beets are actuated by the conveyers.

2. The combination with a conveyer adapted to grasp the tops of beets and suspend them in the upright position, of a second conveyer located throughout its entire extent below the first conveyer and coöperating with the latter to perform the beet carrying function, and a knife interposed between the two conveyers and extending transversely of the line of travel for performing the beet topping function.

3. The combination with a conveyer adapted to grasp the tops of beets and suspend them, of a topping device arranged below the said conveyer, and a second conveyer arranged below the topping device and adapted to act on the beets during the performance of the topping function.

4. The combination with a conveyer adapted to grasp the tops of beets and carry the latter rearwardly in the suspended position, of a second conveyer located throughout its entire extent below the first named conveyer and coöperating with the latter to perform the beet carrying function, and a topping knife arranged in a plane between the two conveyers, the said knife being arranged in opposing relation to the travel of the conveyers substantially as described.

5. The combination with a conveyer arranged to grasp the tops of beets, and carry the latter rearwardly in the suspended position, means for actuating the said conveyer, a second conveyer arranged below the first named conveyer and arranged to act on the beets to facilitate the performance of the carrying function, means for actuating the second conveyer, and a knife arranged in a plane below the first conveyer and in opposing relation to the second conveyer for the purpose set forth.

6. The combination with beet uprooting means, of a conveyer arranged above and extending rearwardly and upwardly from the uprooting means, the said conveyer consisting of two endless coöperating belts whose inner runs are adapted to grasp the tops of the beets and suspend the latter during their upward travel, means for actuating the belts to cause their inner runs to travel rearwardly and upwardly, a second conveyer arranged below the first conveyer, the second conveyer being equipped with flights arranged to act upon the bodies of the beets during their rearward travel, means for actuating the second conveyer, and plates arranged on opposite sides of the beets during their upward travel for protecting the second conveyer from the dirt falling from the beets, substantially as described.

7. The combination with uprooting means, of a conveyer means extending rearwardly from the uprooting means and adapted to grasp the tops of the beets and suspend the latter during their upward travel, a second conveyer arranged below the first conveyer, the second conveyer being composed of separated chains and flights connecting the said chains and extending upwardly from the upper runs of the chains, the said flights being adapted to act upon the beets during their upward and rearward travel, and inclined plates arranged on opposite sides of the path of the travel of the beets, the said plates being located above the chains of the second conveyer and adapted to protect the latter from the dirt falling from the beets during their upward travel.

In testimony whereof I affix my signature in presence of two witnesses.

JOHN A. WEAVER.

Witnesses:
A. J. O'BRIEN,
MAY CLEMENTS.

---

Copies of this patent may be obtained for five cents each, by addressing the "Commissioner of Patents, Washington, D. C."